(12) United States Patent
McCorry et al.

(10) Patent No.: US 8,052,223 B2
(45) Date of Patent: Nov. 8, 2011

(54) MULTI-PIECE VEHICLE WHEEL COVER RETENTION SYSTEM AND METHOD FOR PRODUCING SAME

(75) Inventors: Patrick McCorry, Plymouth, MI (US); Todd Duffield, Westland, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 224 days.

(21) Appl. No.: 12/499,124

(22) Filed: Jul. 8, 2009

(65) Prior Publication Data

US 2011/0006589 A1 Jan. 13, 2011

(51) Int. Cl.
*B60B 7/08* (2006.01)
*B60B 7/04* (2006.01)

(52) U.S. Cl. ............. 301/37.43; 301/37.11; 301/37.102

(58) Field of Classification Search ............. 301/37.101, 301/37.11, 37.23, 37.27, 37.102, 37.106, 301/37.42, 37.43
See application file for complete search history.

(56) References Cited

U.S. PATENT DOCUMENTS

| | | | | |
|---|---|---|---|---|
| 2,358,468 | A | * | 9/1944 | Mulhern .................. 301/37.106 |
| 3,252,738 | A | * | 5/1966 | Huntley .................... 301/37.42 |
| 3,594,046 | A | * | 7/1971 | Marshall ................... 301/37.42 |
| 3,669,501 | A | | 6/1972 | Derleth |
| 3,724,905 | A | * | 4/1973 | Kachler .................... 301/37.42 |
| 3,726,566 | A | | 4/1973 | Beith |
| 4,171,149 | A | * | 10/1979 | Marks et al. ................ 301/37.42 |
| 4,220,373 | A | * | 9/1980 | Spisak ..................... 301/37.42 |
| 4,295,685 | A | * | 10/1981 | Spisak ..................... 301/37.42 |
| 4,542,569 | A | * | 9/1985 | Ladouceur ................. 29/894.38 |
| 5,031,966 | A | | 7/1991 | Oakey |
| 5,188,428 | A | * | 2/1993 | Carter, III ................. 301/37.11 |
| 5,188,429 | A | | 2/1993 | Heck et al. |
| 5,340,418 | A | | 8/1994 | Wei |
| 5,360,261 | A | | 11/1994 | Archibald et al. |
| 5,368,370 | A | | 11/1994 | Beam |
| 5,421,642 | A | | 6/1995 | Archibald |
| 5,533,261 | A | | 7/1996 | Kemmerer |
| 5,564,792 | A | | 10/1996 | Archibald |

(Continued)

FOREIGN PATENT DOCUMENTS

DE 2813412 A1 10/1979

*Primary Examiner* — Kip T Kotter
(74) *Attorney, Agent, or Firm* — MacMillan, Sobanski & Todd, LLC

(57) ABSTRACT

A multi-piece vehicle wheel retention system includes a wheel disc, a first wheel cover and a second wheel cover. The first wheel cover is secured to the wheel disc and includes a generally U-shaped outer end, a first leg which extends generally parallel with respect to the axis, and a second leg which extends generally perpendicular to the first leg. The first wheel cover covers the entire portion of the outboard tire bead seat retaining flange of the wheel disc. The second wheel cover is secured to the first wheel cover and covers at least a portion of the outboard facing wheel surface of the wheel disc. The second wheel cover includes an outboard surface and an inboard surface. At least a portion of the second leg of the first wheel cover extends behind the second wheel cover so as to be adjacent the inboard surface of the second wheel cover and such portion of the second leg is at least secured to the second wheel cover by such portion of the second leg being disposed within a surface feature provided only on the inboard surface of the second wheel cover.

18 Claims, 9 Drawing Sheets

U.S. PATENT DOCUMENTS

| | | |
|---|---|---|
| 5,597,213 A | 1/1997 | Chase |
| 6,152,538 A * | 11/2000 | Ferriss et al. .............. 301/37.33 |
| 6,346,159 B1 | 2/2002 | Chase et al. |
| 6,406,100 B1 | 6/2002 | Kinstler |
| 6,502,308 B1 | 1/2003 | Carfora et al. |
| 6,609,763 B1 | 8/2003 | Kinstler et al. |
| 6,779,852 B2 | 8/2004 | Van Houten et al. |
| 6,991,299 B2 | 1/2006 | Hauler |

* cited by examiner

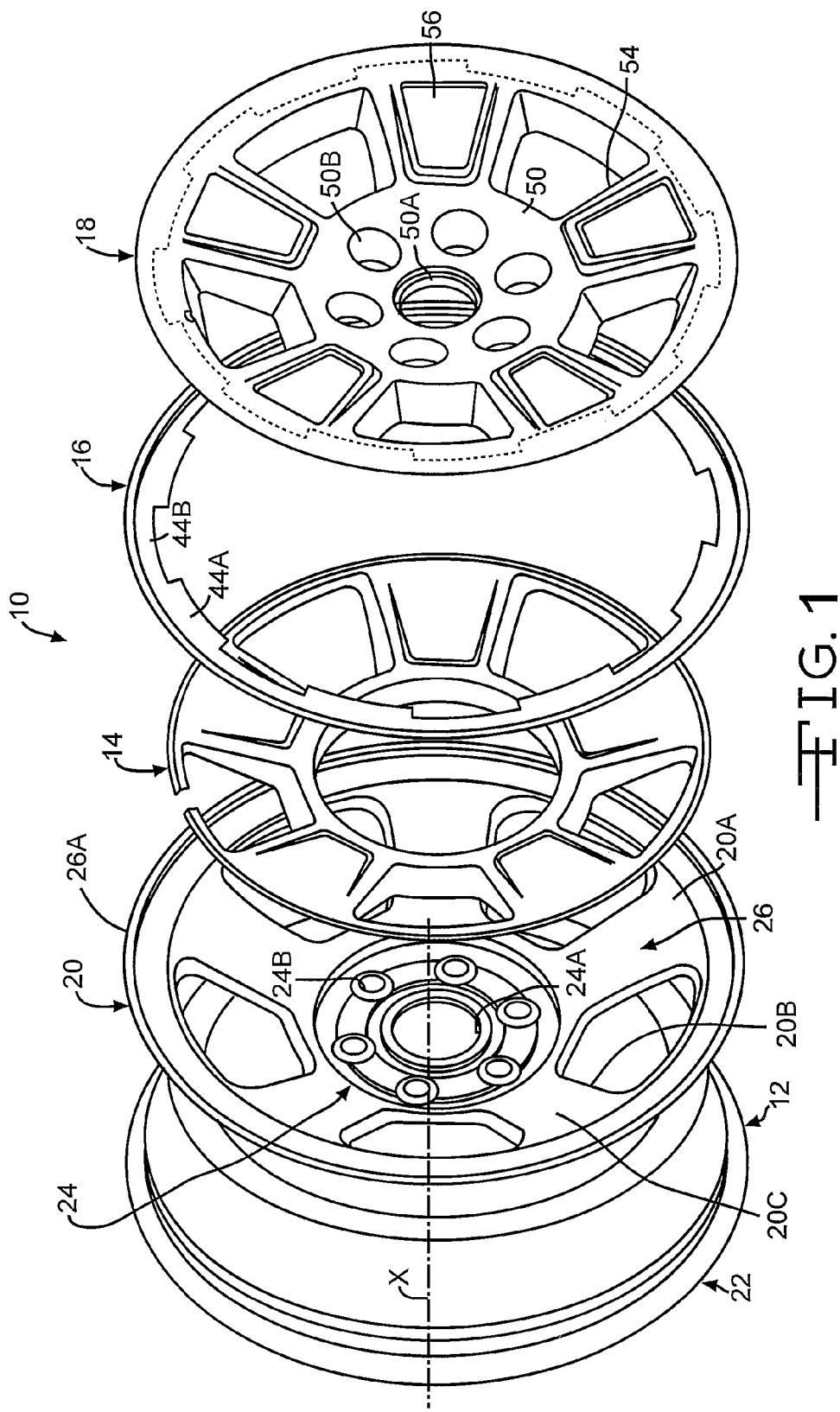

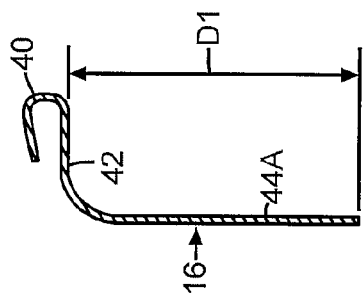
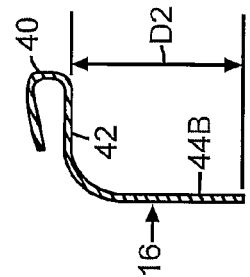
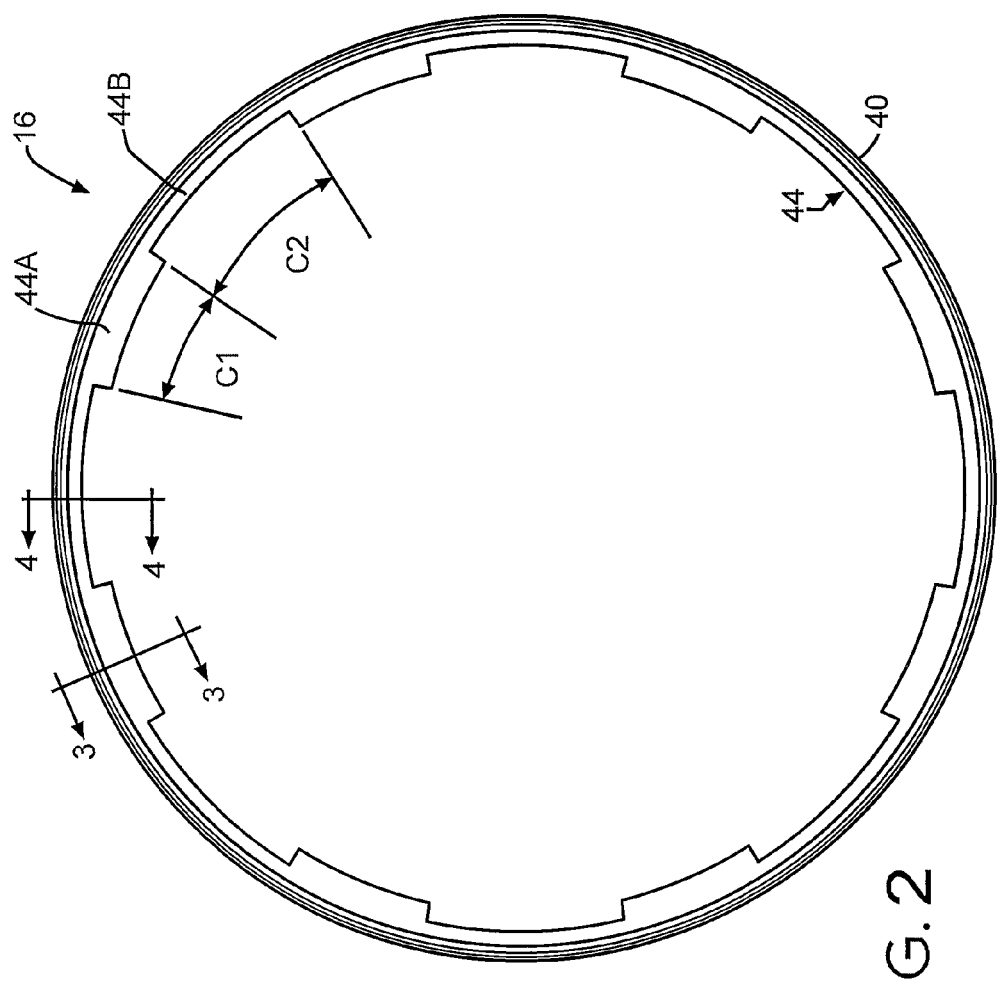

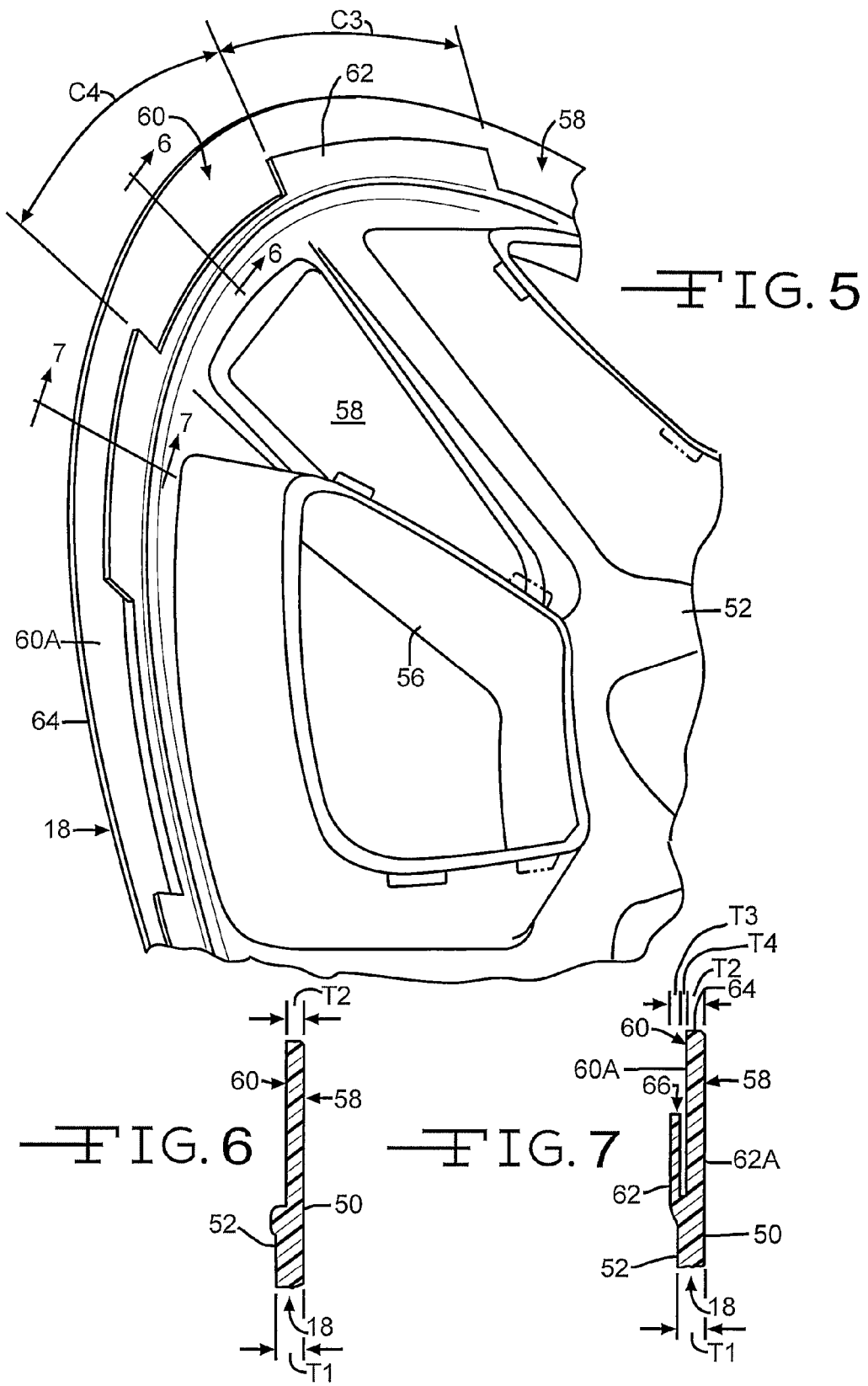

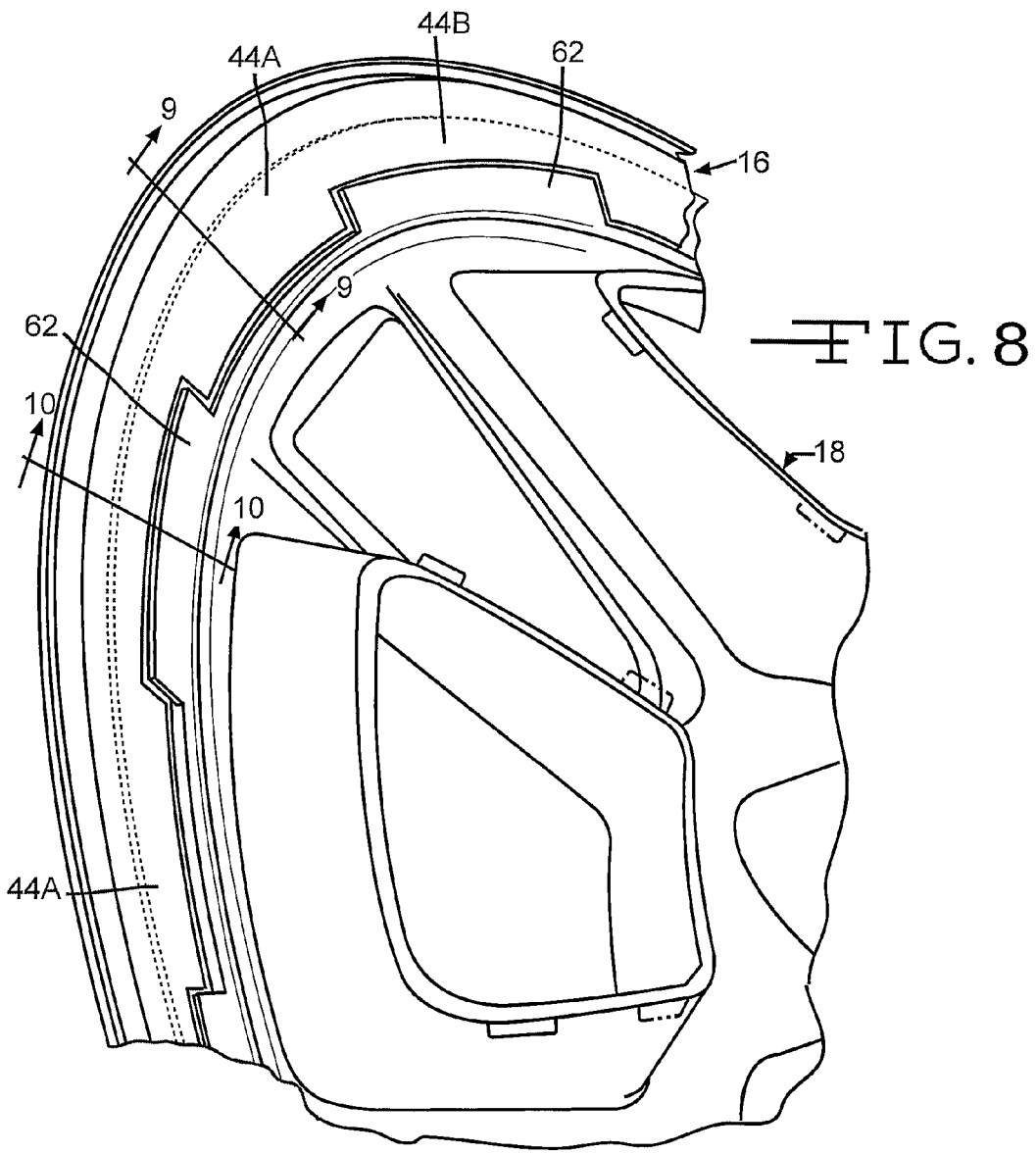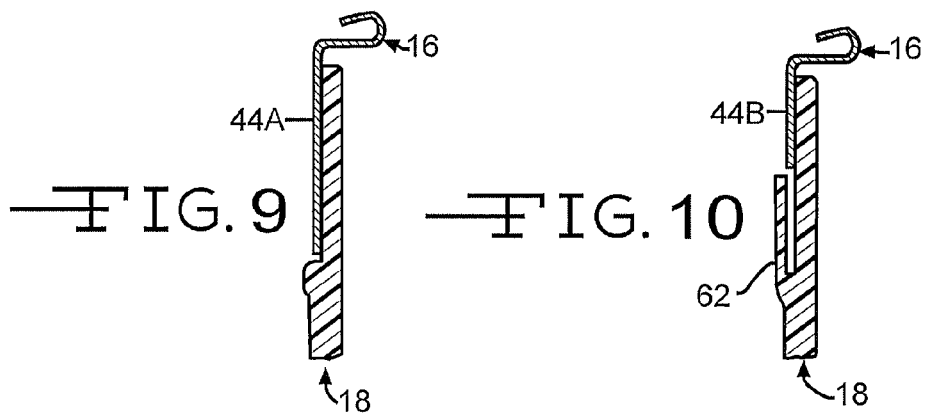

MULTI-PIECE VEHICLE WHEEL COVER RETENTION SYSTEM AND METHOD FOR PRODUCING SAME

BACKGROUND OF THE INVENTION

This invention relates in general to vehicle wheels and, in particular, to an improved multi-piece vehicle wheel cover retention system and method for producing the same.

Full or partial vehicle wheel covers of the removable type are well known, and have been used for many years to enhance the styling of conventional, stamped wheel discs. Also, it is known to permanently secure a full or partial wheel cover to a vehicle wheel using an adhesive.

One example of a vehicle wheel with a permanently secured wheel cover is disclosed in German Patent 2,813,412. In the German Patent, the edges of the wheel cover are profiled to be clamped or hooked into fitting grooves provided on the outboard face of the wheel to secure the cover to the wheel. Additionally, the cover can also be glue-joined to the wheel.

Another example of a vehicle wheel having a permanently secured wheel cover is disclosed in U.S. Pat. No. 3,669,501 to Derleth. In the Derleth patent, a chrome-plated plastic wheel cover includes an outer peripheral flange which overhangs the outboard tire bead seat retaining flange of the wheel, an inner peripheral flange which seats against an outboard surface of a hub sleeve, and an intermediate portion which is spaced outwardly from the face of the wheel. An expanding adhesive material is applied to the outboard surfaces of the wheel. When the adhesive material is expanded, it is operative to fill the void between the wheel and the wheel cover to permanently secure the wheel cover to the outboard face of the wheel.

A further example of a vehicle wheel having a permanently secured wheel cover is disclosed in U.S. Pat. No. 5,031,966 to Oakey. In the Oakey patent, a cast aluminum wheel cover is secured to a disc of a steel wheel using a high density structural adhesive.

A yet further example of a vehicle wheel having a permanently secured wheel cover is disclosed in U.S. Pat. No. 5,368,370 to Beam. In the Beam patent, a chrome-plated stainless steel wheel cover includes an outer peripheral edge which is forced into engagement behind a catch formed in the outer rim flange to hold the wheel cover in place while an adhesive cures.

Still yet a further example of a vehicle wheel having a permanently secured wheel cover is disclosed in U.S. Pat. No. 3,726,566 to Beith. In the Beith patent, a steel, aluminum, or plastic wheel cover is secured to a wheel, and includes a terminal flange having a lip which is formed to grip the edge of the outboard tire bead seat retaining flange of the wheel.

Yet a further example of a vehicle wheel having a permanently secured wheel cover is disclosed in U.S. Pat. No. 6,152,538 to Ferriss et al. In the Ferriss et al. patent, a multi-piece wheel cover assembly is provided which is secured to the associated vehicle wheel.

Still further examples of vehicle wheels having permanently secured wheel covers are disclosed in U.S. Pat. No. 6,406,100 to Kinstler and U.S. Pat. No. 6,609,763 to Kinstler et al. In both of these two patents, a multi-piece wheel cover assembly is provided which is secured to the associated vehicle wheel.

SUMMARY OF THE INVENTION

This invention relates to a multi-piece vehicle wheel retention system comprising: a wheel disc defining and axis and an outboard facing wheel surface and including an outboard tire bead seat retaining flange, the outboard tire bead seat retaining flange including an inner surface having a circumferential, radially outwardly facing groove formed therein; a first wheel cover secured to the wheel disc, the first wheel cover including a generally U-shaped outer end, a first leg which extends generally parallel with respect to the axis, and a second leg which extends generally perpendicular to the first leg, the first wheel cover covering the entire portion of the outboard tire bead seat retaining flange of the wheel disc; and a second wheel cover secured to the first wheel cover, the second wheel cover covering at least a portion of the outboard facing wheel surface of the wheel disc, the second wheel cover including an outboard surface and an inboard surface; wherein at least a portion of the second leg of the first wheel cover extends behind the second wheel cover so as to be adjacent the inboard surface of the second wheel cover and wherein the at least a portion of the second leg of the first wheel cover is at least secured to the second wheel cover by the at least a portion of the second leg being disposed within a surface feature provided only on the inboard surface of the second wheel cover.

In another embodiment of the invention, a multi-piece vehicle wheel retention system comprises: a wheel disc defining and axis and an outboard facing wheel surface and including an outboard tire bead seat retaining flange, the outboard tire bead seat retaining flange including an inner surface having a circumferential, radially outwardly facing groove formed therein; a first wheel cover formed from plastic and secured to the wheel disc, the first wheel cover including a generally U-shaped outer end, a first leg which extends generally parallel with respect to the axis, and a second leg which extends generally perpendicular to the first leg, the first wheel cover covering the entire portion of the outboard tire bead seat retaining flange of the wheel disc; and a second wheel cover formed from steel and secured to the first wheel cover, the second wheel cover covering at least a portion of the outboard facing wheel surface of the wheel disc, the second wheel cover including an outboard surface and an inboard surface; wherein at least a portion of the second leg of the first wheel cover extends behind said second wheel cover so as to be adjacent the inboard surface of the second wheel cover and wherein the at least a portion of the second leg of the first wheel cover is disposed in an interference fit within a surface feature provided only on the inboard surface of the second wheel cover to thereby secure the first and second wheel covers together.

In yet another embodiment of the invention, a multi-piece wheel cover assembly comprises: a first wheel cover defining an axis and including a generally U-shaped outer end, a first leg which extends generally parallel with respect to the axis, and a second leg which extends generally perpendicular to the first leg; and a second wheel cover secured to the first wheel cover, the second wheel cover including an outboard surface and an inboard surface; wherein at least a portion of the second leg of said first wheel cover extends behind the second wheel cover so as to be adjacent the inboard surface of the second wheel cover and wherein the at least a portion of the second leg of the first wheel cover is at least secured to the second wheel cover by the at least a portion of the second leg being disposed within a surface feature provided only on the inboard surface of the second wheel cover.

In another embodiment, a method for producing a multi-piece vehicle wheel retention system comprises the steps of: a) providing a wheel disc defining and axis and an outboard facing wheel surface and including an outboard tire bead seat retaining flange, the outboard tire bead seat retaining flange including an inner surface having a circumferential, radially outwardly facing groove formed therein; b) providing a first wheel cover including a generally U-shaped outer end, a first leg which extends generally parallel with respect to the axis, and a second leg which extends generally perpendicular to the first leg, the first wheel cover covering the entire portion of the outboard tire bead seat retaining flange of the wheel disc; c) providing a second wheel cover covering at least a portion of the outboard facing wheel surface of the wheel disc, the second wheel cover including an outboard surface and an inboard surface; d) securing the first wheel cover and the second wheel cover together wherein at least a portion of the second leg of the first wheel cover extends behind the second wheel cover so as to be adjacent the inboard surface of the second wheel cover and wherein the at least a portion of the second leg of the first wheel cover is at least secured to the second wheel cover by the at least a portion of the second leg being disposed within a surface feature provided only on the inboard surface of the second wheel cover; and e) securing the assembled wheel covers of step d) to the wheel disc to produce the multi-piece vehicle wheel retention system.

Other advantages of this invention will become apparent to those skilled in the art from the following detailed description of the preferred embodiments, when read in light of the accompanying drawings.

BRIEF DESCRIPTION OF THE DRAWINGS

FIG. 1 is an exploded perspective view of a first embodiment of a multi-piece vehicle wheel cover retention system.

FIG. 2 is a plan view of a portion of the vehicle wheel cover retention system illustrated in FIG. 1, showing a portion of the associated multi-piece vehicle wheel cover.

FIG. 3 is a sectional view taken along line 3-3 of FIG. 2.

FIG. 4 is a sectional view taken along line 4-4 of FIG. 2.

FIG. 5 is a view showing the initial assembly of the associated wheel cover of the multi-piece vehicle wheel cover retention system illustrated in FIG. 1.

FIG. 6 is a sectional view taken along line 6-6 of FIG. 5.

FIG. 7 is a sectional view taken along line 7-7 of FIG. 5.

FIG. 8 is a view showing the next step of the assembly of the associated vehicle wheel cover of the multi-piece vehicle wheel cover retention system illustrated in FIG. 1

FIG. 9 is a sectional view taken along line 9-9 of FIG. 8.

FIG. 10 is a sectional view taken along line 10-10 of FIG. 8.

DETAILED DESCRIPTION OF THE INVENTION

Figure 11:
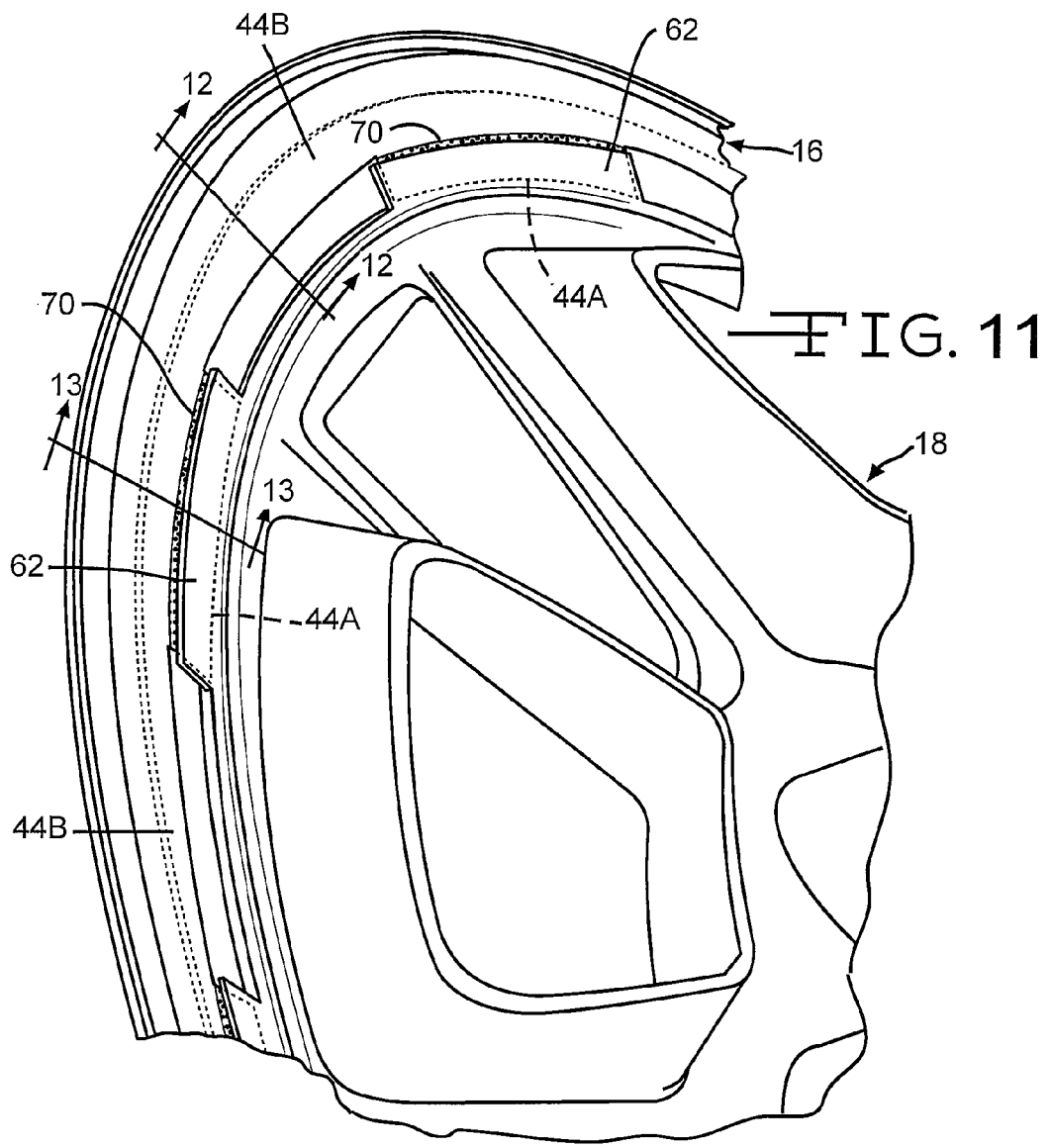
FIG. 11 is a view showing the final step of the assembly of the associated vehicle wheel cover of the multi-piece vehicle wheel cover retention system illustrated in FIG. 1

Referring now to FIG. 1, there is illustrated an exploded perspective view of a first embodiment of a multi-piece vehicle wheel cover retention system, indicated generally at 10, according to the present invention. Although the present invention is illustrated and described in conjunction with the particular vehicle wheel constructions disclosed herein, it will be appreciated that the invention can be used in conjunction with other types of vehicle wheel constructions, if so desired. For example, as shown herein or with modifications thereto, the present invention may be used in connection with associated vehicle wheels formed from any suitable type of material or materials, such as for example, steel, aluminum and alloys thereof, and may be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "fabricated well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euroflange type of wheel such as shown in U.S. Pat. No. 5,564,792 to Archibald, the disclosures of all of these patents incorporated by reference in entirety herein.

As shown therein, the first embodiment of a multi-piece vehicle wheel cover retention system 10 includes a vehicle wheel 12, an insert 14, and a multi-piece wheel cover including a first "outer" wheel cover 16 and a second "inner" wheel cover 18. In the illustrated embodiment, the vehicle wheel 12 is a fabricated full face vehicle wheel (best shown in FIG. 14), and includes an outer full face wheel disc 20 and an inner partial wheel rim 22 which are joined together by one or more welds W.

The wheel disc 20 can be formed from any suitable material, such as for example, steel, aluminum, alloys thereof, magnesium, or titanium. In the illustrated embodiment, the wheel disc 20 defines a wheel axis X and includes a generally centrally located inner wheel mounting surface or portion 24, an outer annular portion 26, and defines an outer surface or outboard face 20A of the vehicle wheel 10. The inner mounting surface 24 of the wheel disc 20 is provided with a center hub hole 24A and a plurality of lug bolt mounting holes 24B spaced circumferentially around the center hub hole 24A. The lug bolt receiving holes 24B are adapted to receive lug bolts (not shown) and nuts (not shown) for securing the vehicle wheel 10 on an axle (not shown) of a vehicle. The outer annular portion 26 includes an outer end 26A which defines an outboard tire bead seat retaining flange of the vehicle wheel 10. Also, as shown in this embodiment, the wheel disc 20 further includes a plurality of windows or openings 20B formed therein between each pair of spokes 20C. Alternatively, as discussed above, the construction, material and/or make-up of the wheel disc 20 may be other than illustrated if so desired.

The wheel rim 22 can be formed from any suitable material, such as for example, steel, aluminum, alloys thereof, magnesium, or titanium. In the illustrated embodiment, the wheel rim 22 includes an inboard tire bead seat retaining flange 32, an inboard tire bead seat 34, a well 36, and an outboard tire bead seat 38. Alternatively, as discussed above, the construction, material and/or make-up of the wheel rim 22 may be other than illustrated if so desired.

Figure 14:
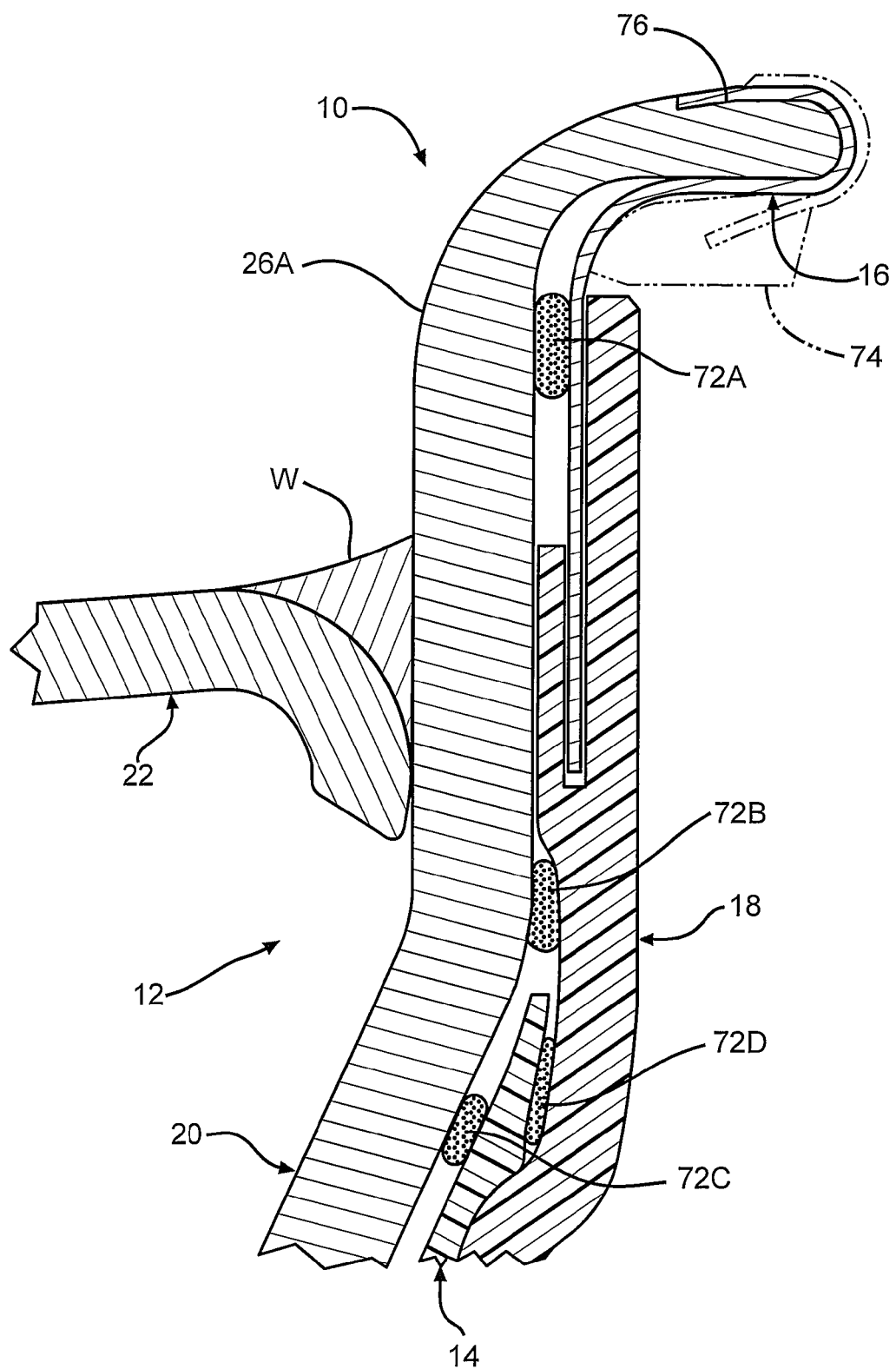
FIG. 14 of a sectional view through of a portion of the assembled multi-piece vehicle wheel cover retention system according to the first embodiment.

In the illustrated embodiment, the insert 14 is preferably a preformed insert formed from a suitable material, such as for example, a suitable foam material. Alternatively, the insert 14 can be formed from other suitable materials and/or can be formed in-situ between the vehicle wheel 12 and the assembled wheel cover 16 and 18 if so desired. Also, depending upon the particular shape of the vehicle wheel 12 and the assembled wheel covers 16 and 18, the insert 14 may not be necessary. However, as shown in FIG. 14, in the illustrated embodiment due to the particular construction of the vehicle wheel 12 and the covers 16 and 18, the insert 14 is preferably used to fill a space which is formed between the outboard face 20A of the wheel 12 and associated inner surface of at least the second wheel cover 18 to result in a "solid" sound rather than a "hollow" sound if the first and second covers 16 and 18 are "tapped" by a person.

In the illustrated embodiment, the insert 14 preferably generally corresponds to the shape of the space which formed between the outboard face 20A of the wheel 12 and the associated inner surface of at least the wheel cover 18. Alternatively, the insert 14 could also fill at least part of a space which is formed between the outboard face 20A of the wheel and the associated inner surface of at least a portion of the wheel cover 16 is do desired. One or more of the insert 14, the first wheel cover 16 and the second wheel cover 18 may be a permanently installed component as discussed in copending U.S. patent application Ser. No. 12/651,523 or may not be a permanently installed component as discussed in copending U.S. patent application Ser. No. 12/834,109, the disclosures of which are incorporated by reference herein in entirety.

In the illustrated embodiment, the first wheel cover 16 is preferably a preformed wheel cover formed from a metal material. More preferably, the first wheel cover 16 is formed from stainless steel having a thickness of approximately 0.020 inch, and is painted, chrome-plated, or brightly polished. Alternatively, the first wheel cover 16 can be formed from other materials if desired. For example, the first wheel cover 16 can be formed from other metals and non-metals, such as for example, aluminum and plastic. Preferably, an outboard surface of the first wheel cover 16 is finished to match an outboard surface of the second wheel cover 18; however, the first wheel cover 16 and the second wheel cover 18 can have different finishes if desired.

As shown in FIGS. 2-4, the first wheel cover 16 is preferably formed from a single piece of material by a stamping operation to produce the unique annular shape best shown in FIG. 2. As shown therein, the first wheel cover 16 includes a generally U-shaped or inverted outer end 40, a first leg 42, and a second leg, indicated generally at 44. The first leg 42 extends generally parallel with respect to the axis X and the second leg 44 extends generally perpendicular to the first leg 42.

As will be discussed below, in the illustrated embodiment, the second leg 44 of the first wheel cover 16 is segmented and includes a plurality of first leg members 44A and a plurality of second leg members 44B. The first leg members 44A extend a first radial distance D1 and the second leg members 44B extend a second radial distance D2 which is less than the first radial distance D1. In the illustrated embodiment, the first leg members 44A extend a first angular extent C1 and the second leg members 44B extend a second angular extent C2 which is greater than the first angular extent C1. Alternatively, the first wheel cover 16 can be formed from other suitable methods, such as for example, by taking a strip or band of material having a desired shape and forming the strip into an annular hoop and welding the ends together. Also, the outer end 40 of the first wheel cover 16 does not have to be preformed prior to assembly onto the associated vehicle wheel 10 but may be formed after assembly onto the vehicle wheel 10. Suitable methods for forming the outer end 40 after assembly are disclosed in U.S. Pat. No. 6,406,100 to Kinstler, U.S. Pat. No. 6,502,308 to Carfora et al., and U.S. Pat. No. 6,609,763 to Kinstler et al., the disclosures of each of these patents incorporated by reference herein in entirety. Alternatively, the construction of the first wheel cover 16 may be other than illustrated if so desired.

In the illustrated embodiment the second wheel cover 18 is preferably formed from a plastic material and is painted or chrome-plated. The second wheel cover 18 can be prefabricated to generally match the particular configuration of the outboard facing surface of the associated vehicle wheel or, as illustrated, can have portions which are spaced apart from the outboard facing surface of the wheel to provide for styling. Alternatively, the second wheel cover 18 can be formed from other materials, such as for example, aluminum or stainless steel, if so desired.

As shown in this embodiment, the second wheel cover 18 includes an outboard face or surface 50 and an inboard face or surface 52, shown in FIGS. 5, 8 and 11. The second wheel cover 18 is provided with a center hub hole 50A, and a plurality of lug bolt mounting holes 50B spaced circumferentially around the center hub hole 50A. Also, as shown in this embodiment, the second wheel cover 18 further includes a plurality of wheel cover decorative windows 54 formed therein between each pair of "solid" spokes 56.

As best shown in FIGS. 5, 8 and 11, an outer peripheral edge, indicated generally at 58, of the inboard surface 52 of the second wheel cover 18 includes a unique configuration having a surface feature provided on the inboard surface 52 for receiving and securing the first wheel cover 16 therewith. In particular, in the illustrated embodiment, the outer peripheral edge 58 of the inboard surface 52 is segmented and includes a generally non-raised or flat continuous surface, indicated generally at 60, and a plurality of spaced apart raised arcuate or circumferentially extending fingers 62 spaced circumferentially away from the surface 60. In the illustrated embodiment, the fingers 62 extend a third angular extent C3 and as shown in FIG. 7, extend outwardly toward but stop short of an outermost circumferential side edge 64 of the second wheel cover 18. As a result of this, a circumferential channel or groove 66 is formed in the outer peripheral edge 58 of the second wheel cover 18 between the adjacent opposed surfaces 60A and 62A of the flat portion 60 and the fingers 62, respectively. The flat portion 60 of the outer peripheral edge 58 which extends between each of the pair of fingers 62 extends a fourth angular extent C4. In the illustrated embodiment, the angular extent C1 of the first wheel cover 16 has to be at least slightly less than the angular extent C4 of the second wheel cover 18, and the angular extent C2 of the first wheel cover 16 has to be at least slightly greater than the angular extent C3 of the second wheel cover 18 for a purpose to be explained below.

As can be seen in the illustrated embodiment, in FIGS. 6 and 7 the second wheel cover 18 defines a generally uniform cover thickness T1 adjacent inwardly relative to the outer peripheral edge 58 thereof. As shown in FIG. 6, the flat portion 60 of the outer peripheral edge 58 define a thickness T2 which is less than the thickness T1. As shown in FIG. 7, the finger 62 defines a thickness T3 and the channel 66 defines a thickness T4. As can be seen in the illustrated embodiment, the combined thicknesses T2, T3 and T4 is greater than the thickness T1. Alternatively, the construction of the second wheel cover 18 may be other than illustrated if so desired.

Referring now to FIGS. 8-10, the first step of the assembly of the first wheel cover 16 to the second wheel cover 18 will be discussed. As shown therein, initially the first wheel cover 16 is disposed adjacent the second wheel cover 18 with the second leg 44 of the first wheel cover 16 adjacent the flat surface 60 of the second wheel cover 18. More particularly, a respective one of each of the first leg members 44A of the first wheel cover 16 is disposed in the space created between each pair of fingers 62 of the second wheel cover 18 (also shown in FIG. 9), and a respective one of each of the second leg members 44B of the first wheel cover 16 is disposed above or outwardly with respect to a respective one of each of the fingers 62 of the second wheel cover 18 (also shown in FIG. 10).

Figures 12, 13:
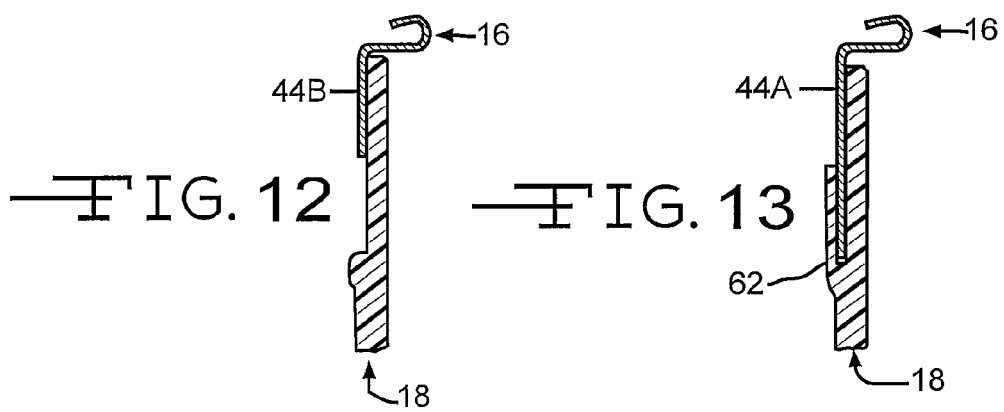
FIG. 12 is a sectional view taken along line 12-12 of FIG. 11.
FIG. 13 is a sectional view taken along line 13-13 of FIG. 11.

Next, preferably the first wheel cover 16 is rotated or "clocked" in either a clockwise or counterclockwise direction relative to the second wheel cover 18 such that a respective one of the first leg members 44A of the first wheel cover 16 is moved into an associated corresponding recess 66 of the second wheel cover 18 (as shown in FIGS. 11 and 13), and a respective one of the second leg members 44B is disposed in the space created between each pair of fingers 62 of the second wheel cover 18 (as shown in FIG. 12). The first leg members 44A are preferably received within the recesses 66 in an interference fit therewith. Also, preferably a suitable adhesive (partially shown in FIG. 11 at 70), may be used to further aid in securing the first wheel cover 16 to the second wheel cover 18. The adhesive 70 could be applied to either the first leg member 44A, the recess 66 or both prior to the above "clocking" step.

Following the step of securing the first wheel cover 16 and the second wheel cover 18 together, the other components of the wheel are assembled to produce the finished multi-piece vehicle wheel cover retention system 10 by any desired suitable method. As shown in FIG. 14, one or more adhesives 72A, 72B, 72C and 72D may be used to secure the associated components together. The adhesives 72A-72D may be of any suitable type, such as for example, an expanding foam adhesive material or a non-expanding foam adhesive material and may be applied between any desired adjacent surfaces of the associated components of the wheel (i.e., the wheel 12, the insert 14, the first wheel cover 16 and/or the second wheel cover 18), if so desired.

The selected adhesive can be selectively applied in a pre-assembly pattern so as to result in a full surface post-assembly pattern (not shown), or in a non-full surface post-assembly pattern (as shown in FIG. 14), i.e., a post-assembly pattern which has one or more voids or gaps 24 therein. Suitable types of non-expanding foam adhesives may include but are not limited to the use of one or a combination of more than one of adhesives selected from the group consisting of silicone, two-part epoxy, urethane, double-sided tape, expanding foam, and the like.

Also, in addition to the selected adhesive material, the other "mechanical" means, such as for example, snap tabs and fasteners, which may be part of the first wheel cover 16 and/or the second wheel cover 18 or separate components relative thereto, may be used to assist in securing the assembled wheel covers 16 and 18 to the vehicle wheel 12. Additionally, the insert 14 may be secured to the second wheel cover 18 by suitable means, i.e., adhesive, mechanical means or a combination of both if so desired (not shown). As discussed above, one or more of the insert 14, the first wheel cover 16 and the second wheel cover 18 may be a permanently installed components or one or more of the insert 14, the first wheel cover 16 and the second wheel cover 18 may not be a permanently installed components. Also, as shown in FIG. 14, the outer end 40 of the first wheel cover 16 is preferably disposed in a circumferential, radially outwardly facing groove 76 formed in an inner surface of the outboard tire bead seat retaining flange 26A so that the first wheel cover 16 does not interfere with the attachment of a wheel balance weight 74 (shown in phantom).

Figure 15:
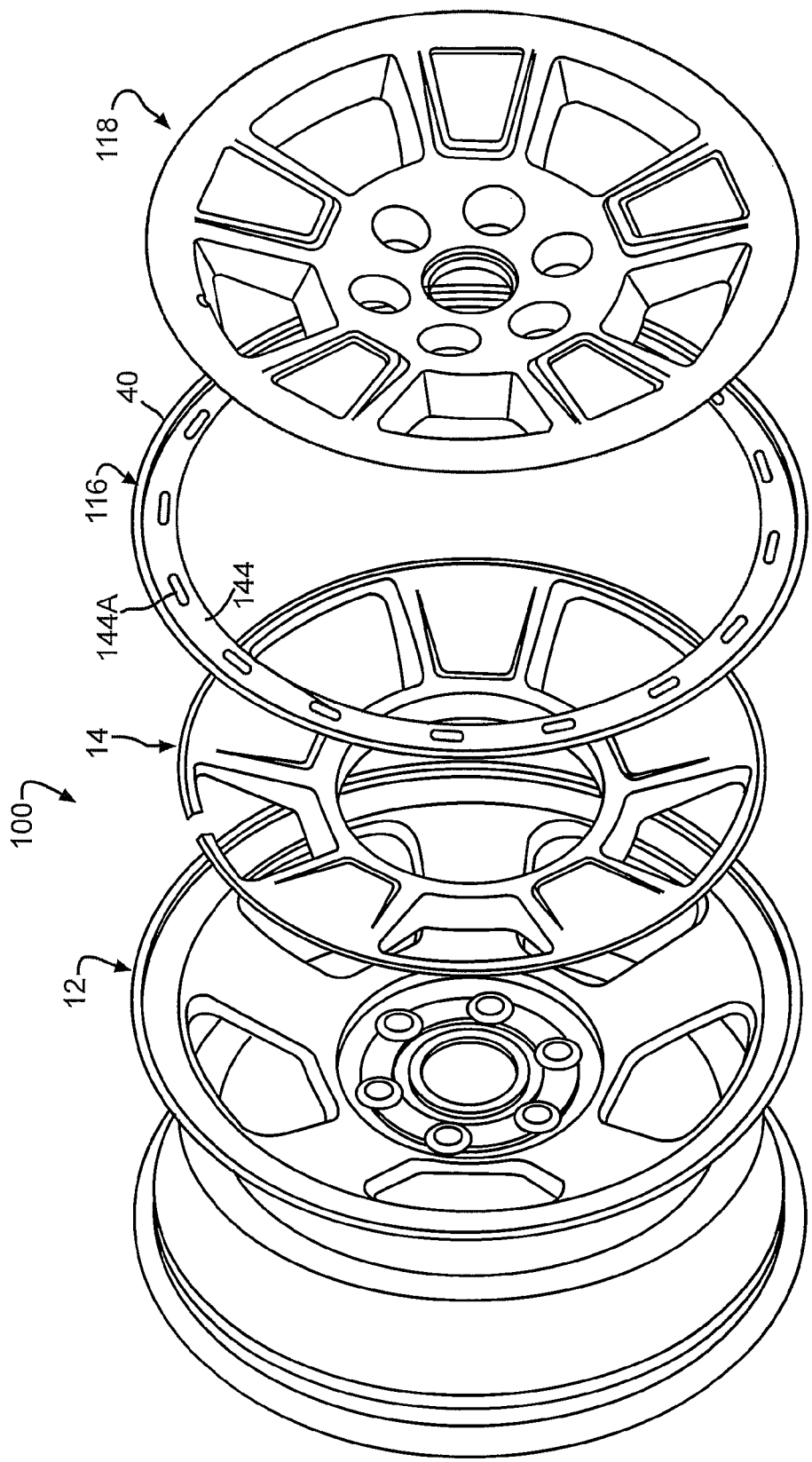
FIG. 15 is an exploded perspective view of a second embodiment of a multi-piece vehicle wheel cover retention system.

Referring now to FIG. 15 and using like reference numbers to indicate corresponding parts, there is illustrated an exploded perspective view of a second embodiment of a multi-piece vehicle wheel cover retention system, indicated generally at 100, according to the present invention. In this embodiment, a first wheel cover 116 and a second wheel cover 118 are provided and which use a different method of securement compared to the first wheel cover 16 and the second wheel cover 18 described above in connection with the first embodiment of the multi-piece vehicle wheel cover retention system 10. Thus, only those portions of the second embodiment of the multi-piece vehicle wheel cover retention system 100 which differ from the first embodiment of the multi-piece vehicle wheel cover retention system 10 will be discussed in detail below. In addition, in this embodiment, an insert (shown in phantom at 114) is optionally provided and may or may not be necessary depending upon the particular wheel configuration.

Figure 16:
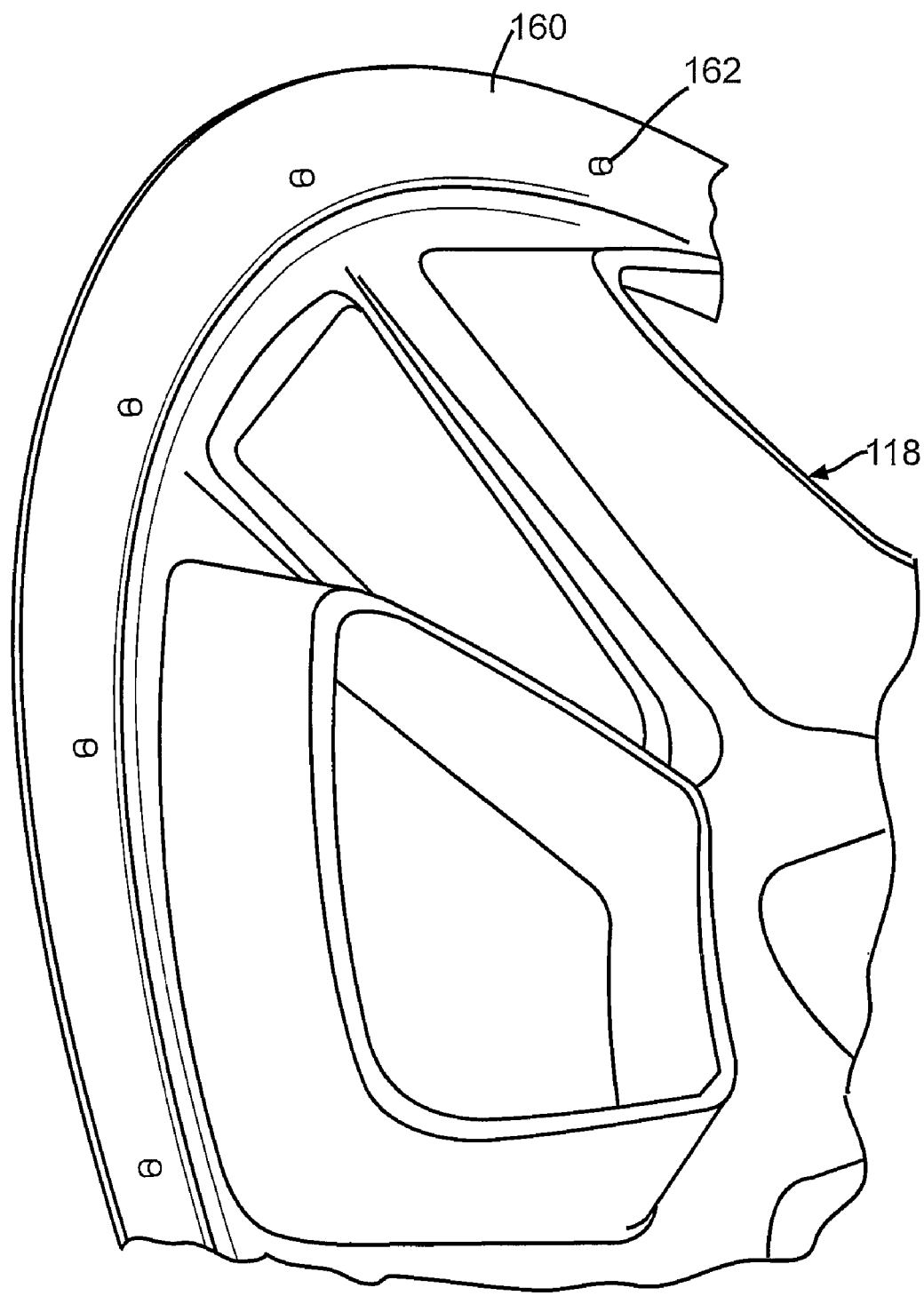
FIG. 16 is a plan view of a portion of the multi-piece vehicle wheel cover retention system illustrated in FIG. 15, showing a portion of the associated vehicle wheel cover, prior to assembly thereof.
Figure 17:
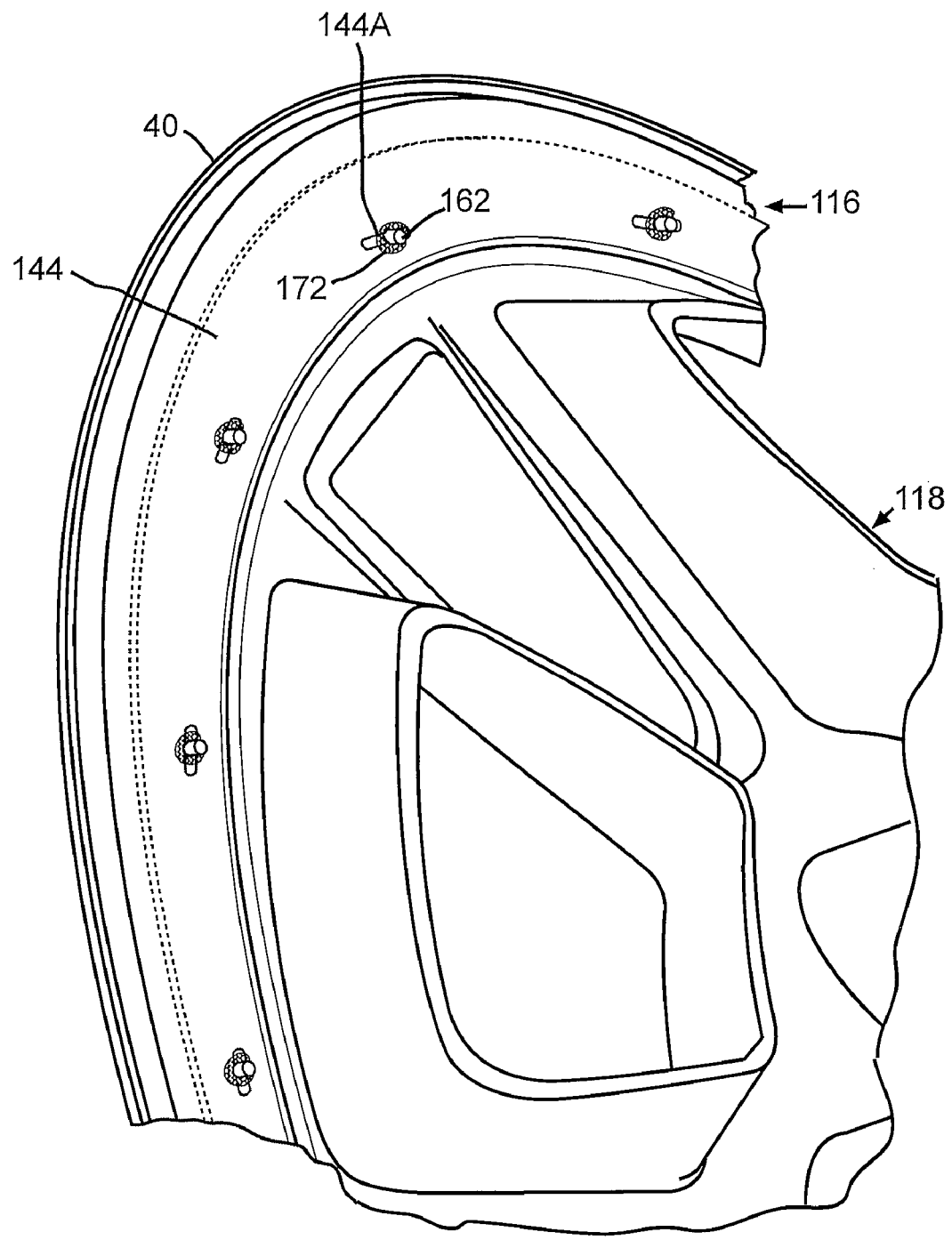
FIG. 17 is a plan view of a portion of the multi-piece vehicle wheel cover retention system illustrated in FIG. 15, showing a portion of the associated vehicle wheel cover following assembly thereof.

As shown in FIG. 15, in this embodiment the first wheel cover 116 is provided with a plurality of openings or slots 144A provided in a second leg 144 thereof. As shown in FIG. 16, in this embodiment the second wheel cover 118 is provided with a surface feature comprising a plurality of upstanding tabs or protuberances 162 extending from a generally flat continuous surface 160 thereof. As a result of this, as shown in FIG. 17, the first wheel cover 116 is secured to the second wheel cover 118 by passing the tabs 162 through the openings 144A preferably in an interference fit therewith. An adhesive (shown at 172 in FIG. 17, may be used to further aid in securing the first wheel cover 116 to the second wheel cover 118. The adhesive could be applied to either the tabs 166, the openings 144A or both prior to the above assembling step. Alternatively, the shape, number or configuration of the openings 144A and/or the tabs 162 may be other than illustrated if so desired.

One advantage of the present invention is that multi-piece vehicle wheel cover retention system 10, 100 covers substantially the entire visible area of the outboard face 20A of the associated vehicle wheel. As a result, the multi-piece vehicle wheel cover retention system 10, 100 completely disguises the configuration of the associated underlying base structural vehicle wheel 12.

In accordance with the provisions of the patent statutes, the principle and mode of operation of this invention have been described and illustrated in its various embodiments. However, it must be understood that the invention may be practiced otherwise than as specifically explained and illustrated without departing from the scope or spirit of the attached claims.

What is claimed is:

1. A multi-piece wheel cover assembly comprising:
   a first wheel cover defining an axis and including a generally U-shaped outer end, a first leg which extends generally parallel with respect to said axis, and a second leg which extends generally perpendicular to said first leg; and
   a second wheel cover secured to said first wheel cover, said second wheel cover including an outboard surface and an inboard surface;
   wherein at least a portion of said second leg of said first wheel cover extends behind said second wheel cover so as to be adjacent said inboard surface of said second wheel cover and wherein said at least a portion of said second leg of said first wheel cover is at least secured to said second wheel cover by said at least a portion of said second leg being disposed within a surface feature provided only on said inboard surface of said second wheel cover;

wherein said second leg of said first wheel cover includes a plurality of first leg members and a plurality of second leg members, said first leg members extending a first radial distance and said second leg members extending a second radial distance which is less than said first radial distance, said first leg members extending a first angular extent and said second leg members extending a second angular extent which is greater than said first angular extent, wherein said inboard surface of said second wheel cover includes an outer peripheral edge which includes a generally flat continuous surface and a plurality of spaced apart raised circumferentially extending fingers spaced circumferentially away from said flat continuous surface, said fingers extending a third angular extent and extend outwardly toward but stopping short of an outermost circumferential side edge of said second wheel cover so as to provide a circumferential groove in said outer peripheral edge of said second wheel cover, said flat portion of said outer peripheral edge which extends between each of a pair of said fingers extending a fourth angular extent, wherein said first angular extent of said first wheel cover is at least slightly less than said fourth angular extent of said second wheel cover and said second angular extent of said first wheel cover is at least slightly greater than said third angular extent of said second wheel cover to allow said first wheel cover to be disposed adjacent said outer peripheral edge of said second wheel cover with said first leg members of said first wheel cover aligned with said flat portion of said outer peripheral edge which extends between each of a pair of said fingers whereby at least one of said first and second wheel covers can be rotated causing said first leg members of said first wheel cover to be received in said circumferential groove of said second wheel cover to thereby secure said first and second wheel covers together.

2. The multi-piece wheel cover assembly of claim 1 wherein said surface feature provided only on said inboard surface of said second wheel cover includes a circumferential groove which receives said at least a portion of said second leg of said first wheel cover.

3. The multi-piece wheel cover assembly of claim 2 wherein said circumferential groove receives said at least a portion of said second leg in an interference fit therewith.

4. The multi-piece wheel cover assembly of claim 3 further including an adhesive disposed in at least one of said circumferential groove and said leg.

5. The multi-piece wheel cover assembly of claim 1 wherein said inboard surface of said second wheel cover includes a plurality of upstanding tabs provided thereon, said first wheel cover includes a plurality of openings formed therein, and wherein said tabs extend through said openings to secure said first and second wheel covers together.

6. A multi-piece vehicle wheel cover retention system comprising:

a wheel disc defining and axis and an outboard facing wheel surface and including an outboard tire bead seat retaining flange, said outboard tire bead seat retaining flange including an inner surface having a circumferential, radially outwardly facing groove formed therein;

a first wheel cover secured to said wheel disc, said first wheel cover including a generally U-shaped outer end, a first leg which extends generally parallel with respect to said axis, and a second leg which extends generally perpendicular to said first leg, said first wheel cover covering the entire portion of said outboard tire bead seat retaining flange of said wheel disc; and a second wheel cover secured to said first wheel cover, said second wheel cover covering at least a portion of said outboard facing wheel surface of said wheel disc, said second wheel cover including an outboard surface and an inboard surface;

wherein at least a portion of said second leg of said first wheel cover extends behind said second wheel cover so as to be adjacent said inboard surface of said second wheel cover and wherein said at least a portion of said second leg of said first wheel cover is at least secured to said second wheel cover by said at least a portion of said second leg being disposed within a surface feature provided only on said inboard surface of said second wheel cover;

wherein said second leg of said first wheel cover includes a plurality of first leg members and a plurality of second leg members, said first leg members extending a first radial distance and said second leg members extending a second radial distance which is less than said first radial distance, said first leg members extending a first angular extent and said second leg members extending a second angular extent which is greater than said first angular extent, wherein said inboard surface of said second wheel cover includes an outer peripheral edge which includes a generally flat continuous surface and a plurality of spaced apart raised circumferentially extending fingers spaced circumferentially away from said flat continuous surface, said fingers extending a third angular extent and extend outwardly toward but stopping short of an outermost circumferential side edge of said second wheel cover so as to provide a circumferential groove in said outer peripheral edge of said second wheel cover, said flat portion of said outer peripheral edge which extends between each of a pair of said fingers extending a fourth angular extent, wherein said first angular extent of said first wheel cover is at least slightly less than said fourth angular extent of said second wheel cover and said second angular extent of said first wheel cover is at least slightly greater than said third angular extent of said second wheel cover to allow said first wheel cover to be disposed adjacent said outer peripheral edge of said second wheel cover with said first leg members of said first wheel cover aligned with said flat portion of said outer peripheral edge which extends between each of a pair of said fingers whereby at least one of said first and second wheel covers can be rotated causing said first leg members of said first wheel cover to be received in said circumferential groove of said second wheel cover to thereby secure said first and second wheel covers together.

7. The multi-piece vehicle wheel cover retention system of claim 6 wherein said surface feature provided only on said inboard surface of said second wheel cover includes a circumferential groove which receives said at least a portion of said second leg of said first wheel cover.

8. The multi-piece vehicle wheel cover retention system of claim 7 wherein said circumferential groove receives said at least a portion of said second leg in an interference fit therewith.

9. The multi-piece vehicle wheel cover retention system of claim 8 further including an adhesive disposed in at least one of said circumferential groove and said leg.

10. The multi-piece vehicle wheel cover retention system of claim 6 wherein said inboard surface of said second wheel cover includes a plurality of upstanding tabs provided thereon, said first wheel cover includes a plurality of openings formed therein, and wherein said tabs extend through said openings to secure said first and second wheel covers together.

11. The multi-piece vehicle wheel cover retention system of claim 6 wherein an insert is provided between said outboard facing wheel surface of said wheel disc and said inboard surface of said second wheel cover.

12. The multi-piece vehicle wheel cover retention system of claim 11 wherein said first wheel cover is formed from a metal material and said second wheel cover is formed from a plastic material.

13. A multi-piece vehicle wheel cover retention system comprising:
a wheel disc defining and axis and an outboard facing wheel surface and including an outboard tire bead seat retaining flange, said outboard tire bead seat retaining flange including an inner surface having a circumferential, radially outwardly facing groove formed therein;
a first wheel cover formed from plastic and secured to said wheel disc, said first wheel cover including a generally U-shaped outer end, a first leg which extends generally parallel with respect to said axis, and a second leg which extends generally perpendicular to said first leg, said first wheel cover covering the entire portion of said outboard tire bead seat retaining flange of said wheel disc; and
a second wheel cover formed from steel and secured to said first wheel cover, said second wheel cover covering at least a portion of said outboard facing wheel surface of said wheel disc, said second wheel cover including an outboard surface and an inboard surface;
wherein at least a portion of said second leg of said first wheel cover extends behind said second wheel cover so as to be adjacent said inboard surface of said second wheel cover and wherein said at least a portion of said second leg of said first wheel cover is disposed in an interference fit within a surface feature provided only on said inboard surface of said second wheel cover to thereby secure said first and second wheel covers together;
wherein said second leg of said first wheel cover includes a plurality of first leg members and a plurality of second leg members, said first leg members extending a first radial distance and said second leg members extending a second radial distance which is less than said first radial distance, said first leg members extending a first angular extent and said second leg members extending a second angular extent which is greater than said first angular extent, wherein said inboard surface of said second wheel cover includes an outer peripheral edge which includes a generally flat continuous surface and a plurality of spaced apart raised circumferentially extending fingers spaced circumferentially away from said flat continuous surface, said fingers extending a third angular extent and extend outwardly toward but stopping short of an outermost circumferential side edge of said second wheel cover so as to provide a circumferential groove in said outer peripheral edge of said second wheel cover, said flat portion of said outer peripheral edge which extends between each of a pair of said fingers extending a fourth angular extent, wherein said first angular extent of said first wheel cover is at least slightly less than said fourth angular extent of said second wheel cover and said second angular extent of said first wheel cover is at least slightly greater than said third angular extent of said second wheel cover to allow said first wheel cover to be disposed adjacent said outer peripheral edge of said second wheel cover with said first leg members of said first wheel cover aligned with said flat portion of said outer peripheral edge which extends between each of a pair of said fingers whereby at least one of said first and second wheel covers can be rotated causing said first leg members of said first wheel cover to be received in said circumferential groove of said second wheel cover to thereby secure said first and second wheel covers together.

14. The multi-piece vehicle wheel cover retention system of claim 13 wherein said surface feature provided only on said inboard surface of said second wheel cover includes a circumferential groove which receives said at least a portion of said second leg of said first wheel cover.

15. The multi-piece vehicle wheel cover retention system of claim 13 wherein an insert is provided between said outboard facing wheel surface of said wheel disc and said inboard surface of said second wheel cover.

16. The multi-piece vehicle wheel cover retention system of claim 15 further including an adhesive disposed in at least one of said circumferential groove and said leg.

17. The multi-piece vehicle wheel cover retention system of claim 13 wherein said inboard surface of said second wheel cover includes a plurality of upstanding tabs provided thereon, said first wheel cover includes a plurality of openings formed therein, and wherein said tabs extend through said openings to secure said first and second wheel covers together.

18. A method for producing a multi-piece vehicle wheel cover retention system comprising the steps of:
a) providing a wheel disc defining and axis and an outboard facing wheel surface and including an outboard tire bead seat retaining flange, the outboard tire bead seat retaining flange including an inner surface having a circumferential, radially outwardly facing groove formed therein;
b) providing a first wheel cover including a generally U-shaped outer end, a first leg which extends generally parallel with respect to the axis, and a second leg which extends generally perpendicular to the first leg, the first wheel cover covering the entire portion of the outboard tire bead seat retaining flange of the wheel disc;
c) providing a second wheel cover covering at least a portion of the outboard facing wheel surface of the wheel disc, the second wheel cover including an outboard surface and an inboard surface;
d) securing the first wheel cover and the second wheel cover together wherein at least a portion of the second leg of the first wheel cover extends behind the second wheel cover so as to be adjacent the inboard surface of the second wheel cover and wherein the at least a portion of the second leg of the first wheel cover is at least secured to the second wheel cover by the at least a portion of the second leg being disposed within a surface feature provided only on the inboard surface of the second wheel cover, wherein the second leg of the first wheel cover includes a plurality of first leg members and a plurality of second leg members, the first leg members extending a first radial distance and the second leg members extending a second radial distance which is less than the first radial distance, the first leg members extending a first angular extent and the second leg members extending a second angular extent which is greater than the first angular extent, wherein the inboard surface of the second wheel cover includes an outer peripheral edge which includes a generally flat continuous surface and a plurality of spaced apart raised circumferentially extending fingers spaced circumferentially away from the flat continuous surface, the fingers extending a third angular extent and extend outwardly toward but stopping short of an outermost circumferential side edge of the second wheel cover so as to provide a circumferential groove in the outer peripheral edge of the second wheel cover, the flat portion of the outer peripheral edge which extends between each of a pair of the fingers extending a fourth angular extent, wherein first angular extent of the first wheel cover is at least slightly less than the fourth angular extent of the second wheel cover and the second angular extent of the first wheel cover is at least slightly greater than the third angular extent of the second wheel cover to allow the first wheel cover to be disposed adjacent said outer peripheral edge of said second wheel cover with the first leg members of the first wheel cover aligned with the flat portion of the outer peripheral edge which extends between each of a pair of the fingers whereby at least one of the first and second wheel covers can be rotated causing the first leg members of the first wheel cover to be received in the circumferential groove of the second wheel cover to thereby secure the first and second wheel covers together; and e) securing the assembled wheel covers of step d) to the wheel disc to produce the multi-piece vehicle wheel retention system.

* * * * *